(12) United States Patent
Kim

(10) Patent No.: US 8,510,443 B2
(45) Date of Patent: Aug. 13, 2013

(54) REAL-TIME HARMFUL WEBSITE BLOCKING METHOD USING OBJECT ATTRIBUTE ACCESS ENGINE

(75) Inventor: Seong-Jin Kim, Daejeon (KR)

(73) Assignee: Humotion Co., Ltd., Daejeon (KR)

( * ) Notice: Subject to any disclaimer, the term of this patent is extended or adjusted under 35 U.S.C. 154(b) by 208 days.

(21) Appl. No.: 12/972,284

(22) Filed: Dec. 17, 2010

(65) Prior Publication Data

US 2011/0087781 A1     Apr. 14, 2011

Related U.S. Application Data

(63) Continuation of application No. PCT/KR2009/002526, filed on May 13, 2009.

(30) Foreign Application Priority Data

Jun. 19, 2008    (KR) .................. 10-2008-0057984

(51) Int. Cl.
*G06F 15/173*     (2006.01)
*G06F 11/00*      (2006.01)

(52) U.S. Cl.
USPC ............. 709/225; 709/223; 709/224; 726/23; 726/24; 726/25

(58) Field of Classification Search
USPC .................................. 709/225, 223; 726/25
See application file for complete search history.

(56) References Cited

U.S. PATENT DOCUMENTS

| | | | |
|---|---|---|---|
| 6,400,996 B1 | 6/2002 | Hoffberg et al. | |
| 7,162,714 B2 * | 1/2007 | Wenisch ........ | 717/127 |
| 8,176,555 B1 * | 5/2012 | Schreiner et al. ........ | 726/23 |
| 8,224,950 B2 * | 7/2012 | Humes ........ | 709/224 |
| 2001/0044818 A1 * | 11/2001 | Liang ........ | 709/201 |
| 2002/0122065 A1 * | 9/2002 | Segal et al. ........ | 345/783 |
| 2003/0023708 A1 * | 1/2003 | Jung ........ | 709/221 |
| 2003/0182420 A1 * | 9/2003 | Jones et al. ........ | 709/224 |
| 2004/0006621 A1 * | 1/2004 | Bellinson et al. ........ | 709/225 |
| 2006/0200441 A1 * | 9/2006 | Nagatsuka ........ | 707/1 |
| 2007/0061450 A1 * | 3/2007 | Burnley et al. ........ | 709/224 |
| 2007/0067623 A1 * | 3/2007 | Ward ........ | 713/164 |
| 2007/0101353 A1 * | 5/2007 | Jeong et al. ........ | 725/13 |

(Continued)

FOREIGN PATENT DOCUMENTS

| | | |
|---|---|---|
| KR | 10-2005-0117152 A | 12/2005 |
| KR | 10-2006-0089555 A | 8/2006 |
| KR | 10-0628313 B1 | 9/2006 |

OTHER PUBLICATIONS

International Search Report for PCT/KR2009/002526, dated Dec. 23, 2009.

*Primary Examiner* — Backhean Tiv
*Assistant Examiner* — Sheraz A Khan
(74) *Attorney, Agent, or Firm* — Knobbe, Martens, Olson & Bear LLP

(57) ABSTRACT

A real-time harmful website blocking method using an object attribute access engine is disclosed. In one embodiment, information about visual objects, currently being displayed on a screen by processes currently being executed, is obtained from a client. Attributes of the visual objects are extracted from the obtained information about the visual objects. Whether harmfulness is present is determined based on the extracted object attributes, and thus whether to block access to a server being connected thereto is decided. The client is requested to terminate a process for displaying the visual objects.

8 Claims, 7 Drawing Sheets

(56) References Cited

U.S. PATENT DOCUMENTS

| | | | |
|---|---|---|---|
| 2007/0198711 A1* | 8/2007 | Maring | 709/225 |
| 2007/0226256 A1* | 9/2007 | Imai | 707/104.1 |
| 2007/0289019 A1* | 12/2007 | Lowrey | 726/24 |
| 2008/0072225 A1* | 3/2008 | Nagatsuka et al. | 718/100 |
| 2009/0199297 A1* | 8/2009 | Jarrett et al. | 726/24 |

\* cited by examiner

Figure 8
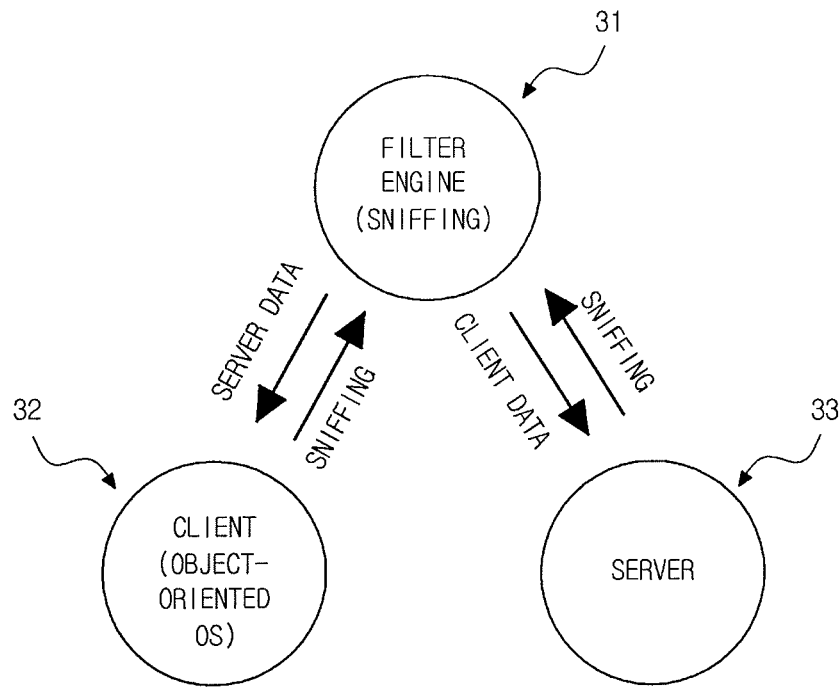
(a)
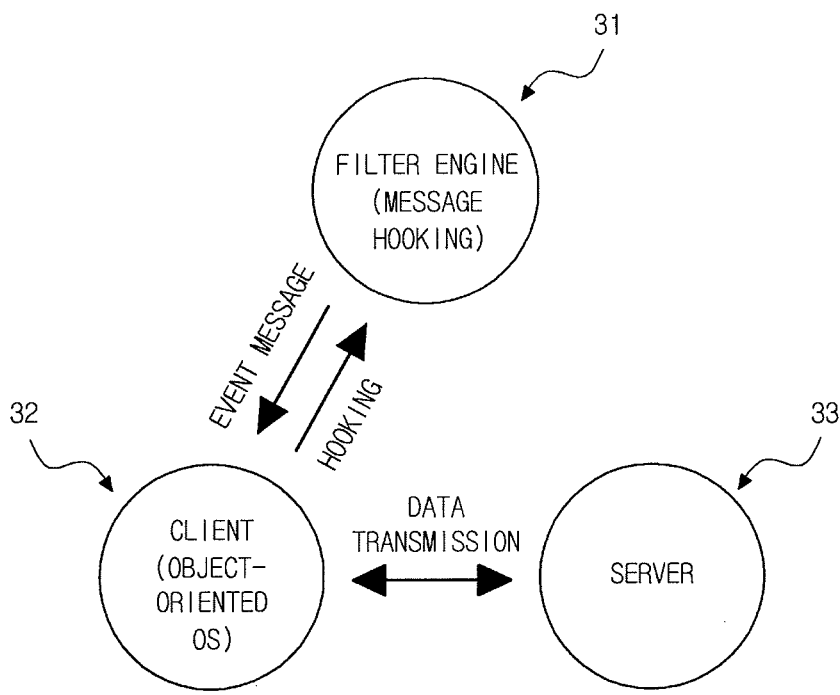
(b)

REAL-TIME HARMFUL WEBSITE BLOCKING METHOD USING OBJECT ATTRIBUTE ACCESS ENGINE

CROSS-REFERENCE TO RELATED APPLICATIONS

This application is a continuation application, and claims the benefit under 35 U.S.C. §§120 and 365 of PCT Application No. PCT/KR2009/002526, filed on May 13, 2009, which is hereby incorporated by reference. The PCT application also claimed priority to and the benefit of Korean Patent Application No. 10-2008-0057984 filed on Jun. 19, 2008 in the Korean Intellectual Property Office, which is incorporated herein by reference [phrases in red need to be modified].

BACKGROUND

1. Field

The described technology generally relates to a harmful website blocking method, and, more particularly, to a real-time harmful website blocking method using an object attribute access engine.

2. Description of the Related Technology

Harmful Internet websites refer to all web pages which are created in such a way that various types of harmful information such as obscene pictures, obscene novels or obscene videos are converted into program files or are created using the properties of a computer, in order to enable the harmful information to be viewed through the computer, and which can unsoundly influence Internet users and can be accessed over the Internet. The blocking of access to harmful websites is required so as to protect teenagers or restrict the use of specific computers. Various types of programs were or have been developed to block such a harmful website.

Generally, a harmful website blocking program uses a network sniffing method or a Windows hooking method. The term 'sniffing' means a technology for obtaining necessary information from packets flowing through Ethernet cables by controlling Ethernet devices. Further, the term 'hooking' means a technology for allowing a user to perform a desired operation by hooking a specific event or function.

SUMMARY

One inventive aspect is a real-time harmful website blocking method using an object attribute access engine, which obtains information about the object attributes of visual objects currently being displayed on a screen by a process executed in real time on a client, and then determines whether a relevant website is a harmful website.

Another aspect is a real-time harmful website blocking method using an object attribute access engine, comprising the steps of obtaining information about visual objects, currently being displayed on a screen by processes currently being executed, from a client; extracting attributes of the visual objects from the information about the visual objects; determining whether harmfulness is present based on the extracted object attributes, and thus deciding whether to block access to a server being connected thereto; and requesting the client to terminate a process for displaying the visual objects.

In accordance with one embodiment, the client is an object-oriented Operating System (OS) running on a user computer.

In accordance with a further embodiment, the information about the visual objects is requested at regular periods of about 0.05 ms to 1 ms.

In one embodiment, the step of obtaining the information about the visual objects comprises the steps of retrieving a list of processes currently being executed and process information from the client; transmitting an instruction for obtaining a handle ID value of a currently activated window to the client and obtaining the handle ID value; requesting the client to convert the handle ID value into a process ID value of a process for executing the window, and obtaining the process ID value; finding an identical process corresponding to the process ID value from the list of processes currently being executed and process information, based on the process ID value; extracting a root visual object from the found identical process, and obtaining a handle ID value of the visual object; and obtaining handle ID values of lower visual objects based on the handle ID value of the root visual object.

Further, the step of extracting the attributes of the visual objects comprises the steps of calling individual attributes of the visual objects on the client and obtaining the individual attributes from the client, based on the handle ID values of the visual objects; and grouping visual objects having an identical parent visual object through the obtained attributes of the visual objects, and generating connection relationships between the visual objects.

Further, the step of determining whether harmfulness is present and deciding whether to block access comprises the steps of comparing, in a first blocking determination stage, connection relationships between objects previously obtained from obscene websites to be blocked and previously stored, with connection relationships between the visual objects obtained from the processes currently being executed, and then deciding to block a relevant process when the connection relationships are identical to each other; if the process passes the first blocking determination stage, comparing, in a second blocking determination stage, object style attributes and location and size attributes, previously set as properties of obscene websites to be blocked, with object style attributes and location and size attributes of the visual objects obtained from the processes currently being executed, and then deciding to block the relevant process when the object style attributes and the location size attributes are identical to each other; if the process passes the second blocking determination stage, determining, in a third blocking determination stage, using a database in which words having a possibility of being highly obscene are previously selected from Hypertext Markup Language (HTML) text of obscene websites to be blocked and are previously stored, whether the selected words are included in HTML text of the visual objects obtained from the processes currently being executed, and then deciding to block the relevant process, based on a result of the determination; and if the process passes the third blocking determination stage, deciding to block the relevant process in a fourth blocking determination stage when an Internet address of a website on which the visual objects obtained from the processes currently being executed are displayed is present in a database in which Internet addresses of obscene websites to be blocked are stored.

Further, the third blocking determination stage is performed such that the selected words are classified in descending order of a possibility of being obscene into respective grades, and are stored in a database with weights assigned to the grades, and the HTML text included in the visual objects obtained from the processes currently being executed is searched for words identical to the selected words, weights are assigned to the found words, and it is determined that the process is a harmful process if a total sum of the found words exceeds a preset value.

Further, the step of requesting the client to terminate the process comprises the steps of accessing a relevant process determined to be harmful in termination mode, based on a process ID value of the relevant process, and obtaining authority for the process from the client; obtaining a termination code of the process from the client; and transmitting the termination code to the client and terminating the relevant process.

According to still another embodiment, the step of obtaining the information about the visual objects, the step of extracting the attributes of the visual objects or the step of determining whether harmfulness is present and deciding whether to block the process is re-executed if the step is delayed by a predetermined period of time or longer.

In this case, the re-execution is performed by a watchdog timer.

BRIEF DESCRIPTION OF THE DRAWINGS

FIG. 8 is a diagram showing a harmful website blocking method.

DETAILED DESCRIPTION

Figure 1:
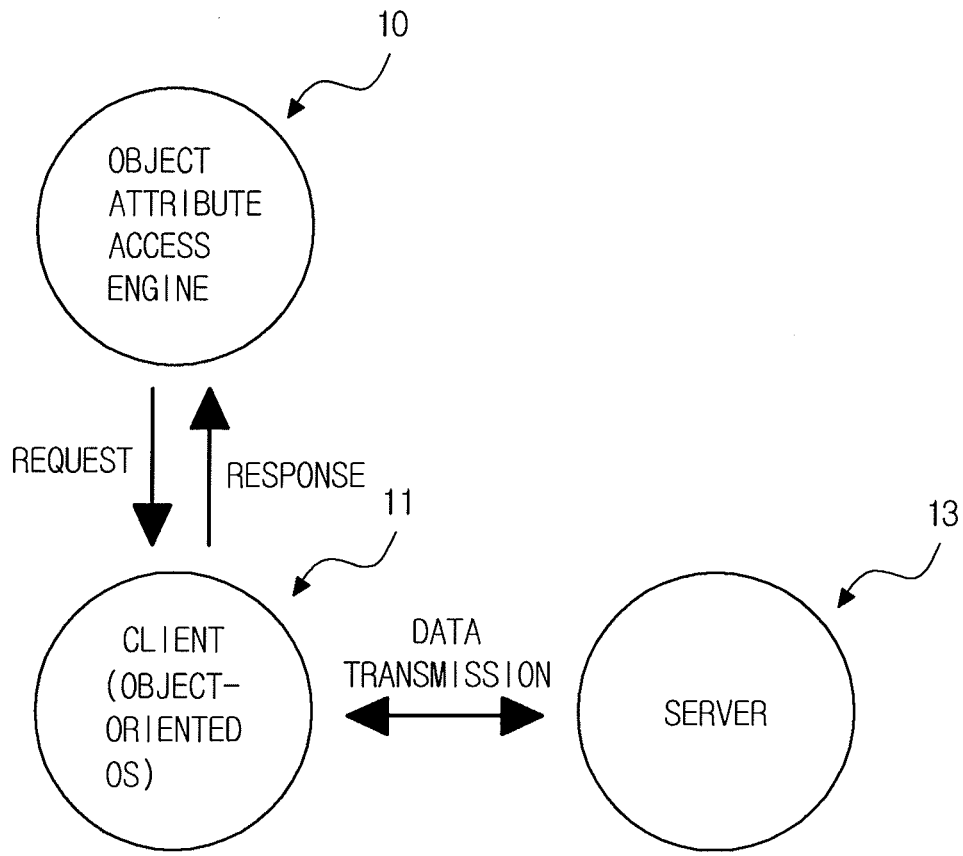
FIGS. 1 and 2 are diagrams showing embodiments of an object attribute access model according to one embodiment.

Methods of blocking harmful websites using the sniffing method or the Windows hooking method are shown in FIGS. 8A and 8B.

FIGS. 8A and 8B illustrate a sniffing method and a hooking method, respectively. As shown in FIGS. 8A and 8B, a filter engine 31 in which a harmful website blocking program is installed obtains information about the access of a client 32 by sniffing data that is transmitted from the client 32 to a server 33 or by hooking an event message that is generated by the Windows OS of the client 32. In the case of the sniffing method shown in FIG. 8A, the transmission of data is not directly performed between the client 32 and the server 33. In contrast, in the case of the Windows hooking method shown in FIG. 8B, the transmission of data is performed between the client 32 and the server 33, but the filter engine 31 hooks an event message generated by the Windows of the client 32.

In the sniffing method, data that is transmitted between the client 32 and the server 33 must be sniffed by the filter engine 31, and during this procedure, a network packet may be dropped or the filter engine 31 may cause errors. In this case, the transmission of data between the client 32 and the server 33 is interrupted, and thus access to the Internet may be interrupted or Internet access speed may decrease.

In detail, the network sniffing method sniffs a packet that is transmitted over the network, and thus determines based on the packet whether a relevant website is harmful. Such a network sniffing method is problematic in that, when the transmission of packets is excessively delayed due to the determination of harmfulness, or when an error occurs in a determination/transmission procedure, Internet access speed may decrease, or Internet access may be interrupted.

In such a sniffing method, the filter engine 31 is integrated and operated with the client 32 and the server 33 in the network. Accordingly, when an error occurs in a harmfulness blocking program, an error may also occur in the access by the client 32 and the server 33, and thus the sniffing method may prove to be a very unstable harmfulness blocking program model.

In addition, in the case where a security program is installed, when sniffing is performed, the security program may erroneously recognize the sniffing as hacking occurring in the filter engine 31 and may interfere with the sniffing, thus making it difficult to perform the determination of harmfulness.

The sniffing method currently used by most (about 80% of) harmfulness blocking programs has problems in that it may not only cause substantially unstable access between the client 32 and the server 33, but also make it difficult to determine harmfulness when a security program is installed.

The Windows hooking method corresponding to the other harmful website blocking program determines harmfulness by hooking an event message generated by Windows rather than over a network, as described above. Since the Windows hooking method does not make a direct connection to the network, problems such as the delay or interruption of Internet access do not occur.

However, there is a problem in that, since a network packet is directly transmitted between the client 32 and the server 33, required blocking is delayed, and thus a user may be exposed to a harmful website for a long period of time, for example, 30 seconds or longer. Furthermore, Windows itself may be made unstable due to the hooking of Windows messages. For example, when an error occurs in a harmfulness examination process, a message attributable to hooking is not transferred to an execution program. As a result, the program is not executed, so that an error occurs in Windows itself, thus resulting in an interruption in the execution of Windows. In this way, the Windows hooking method which is currently well known as an improved method and occupies about 20% of the field may cause the problem of delaying the blocking time or interrupting Windows.

As described above, the existing harmful website blocking model is problematic in that the delay/interruption of access to the network, the deterioration of the performance of a computer, or an interruption of operation may occur. These problems occurring in the conventional technology result from hooking. When an error occurs in a blocking program itself for which hooking occurs, an error also occurs in the entire network access or the operation of Windows. Since a harmful website blocking program must be executed in real-time as a background program during the operation of a computer, it must have stability. However, it can be seen that, since the above technology uses a technique called 'hooking', it is a very instable model.

Hereinafter, embodiments will be described with reference to the accompanying drawings. In the drawings, the same reference numerals are used throughout the different drawings to designate the same or similar components. Further, a detailed description of related well-known functions or components may be omitted, but this is for the convenience of description.

Figure 2:
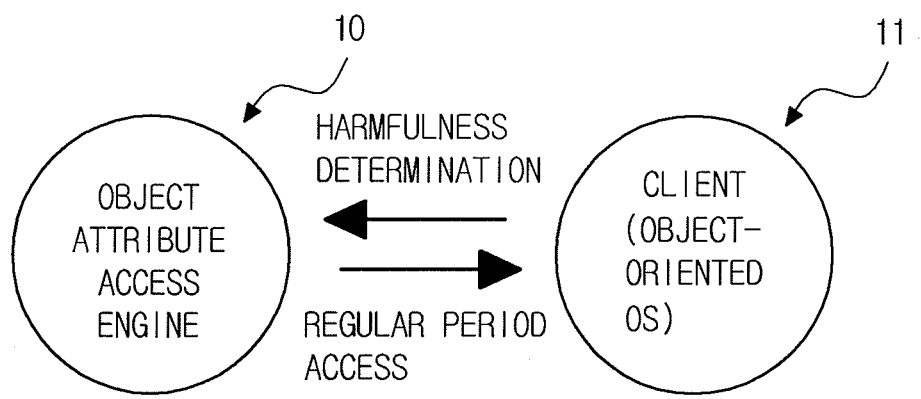
Figure 3:
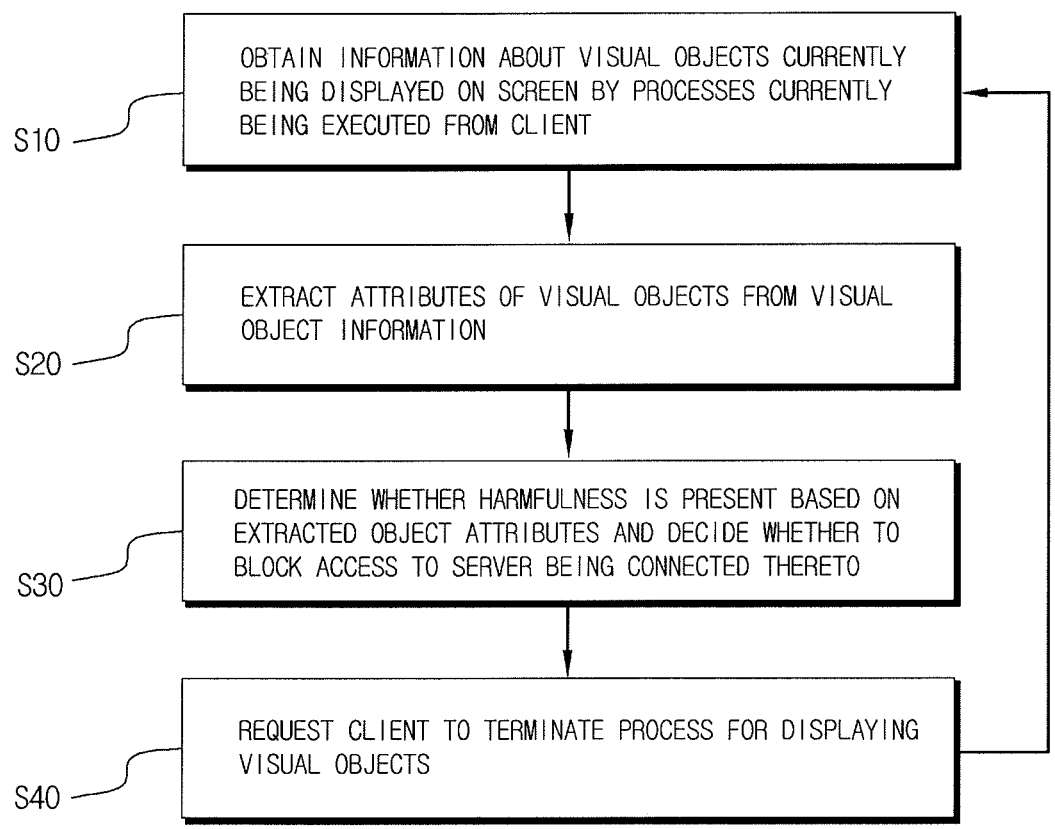
FIGS. 3 to 7 are flowcharts showing embodiments of a process for determining whether harmfulness is present, on the basis of object attributes obtained from a client, in an object attribute access engine according to one embodiment.
Figure 4:
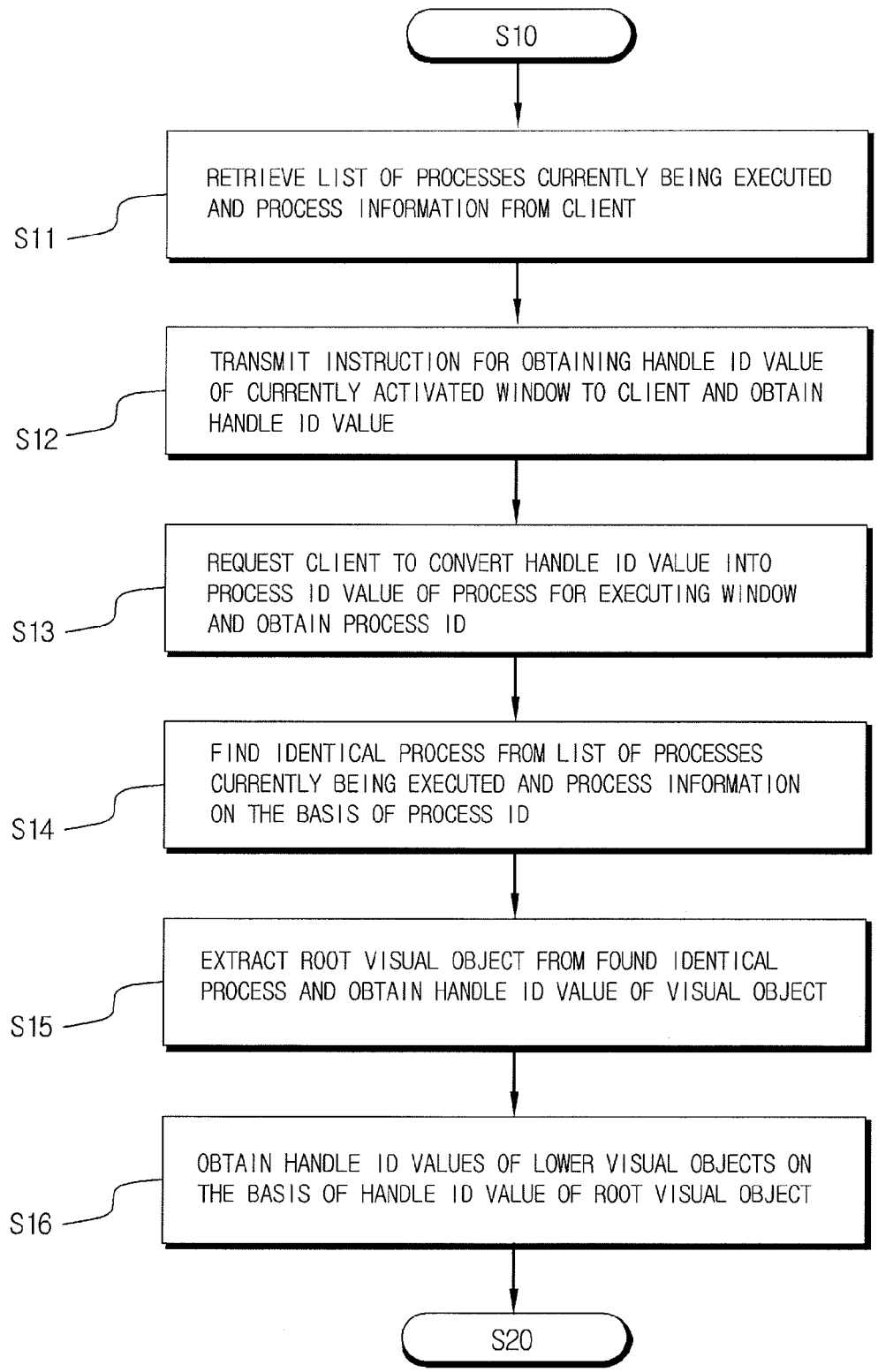
Figure 5:
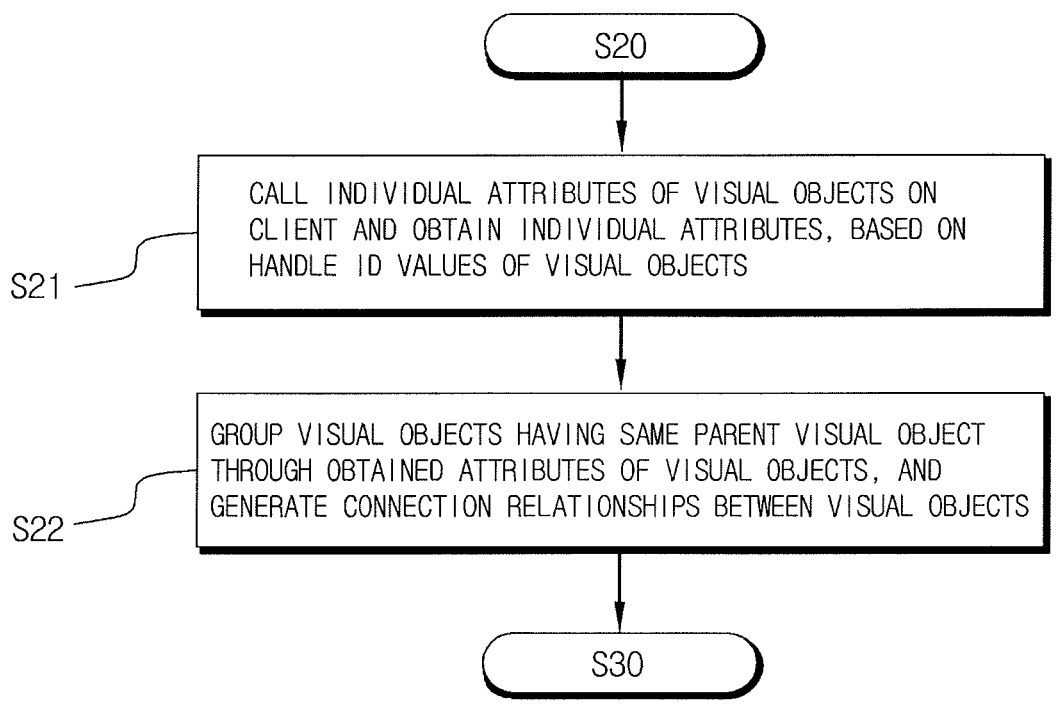
Figure 6:
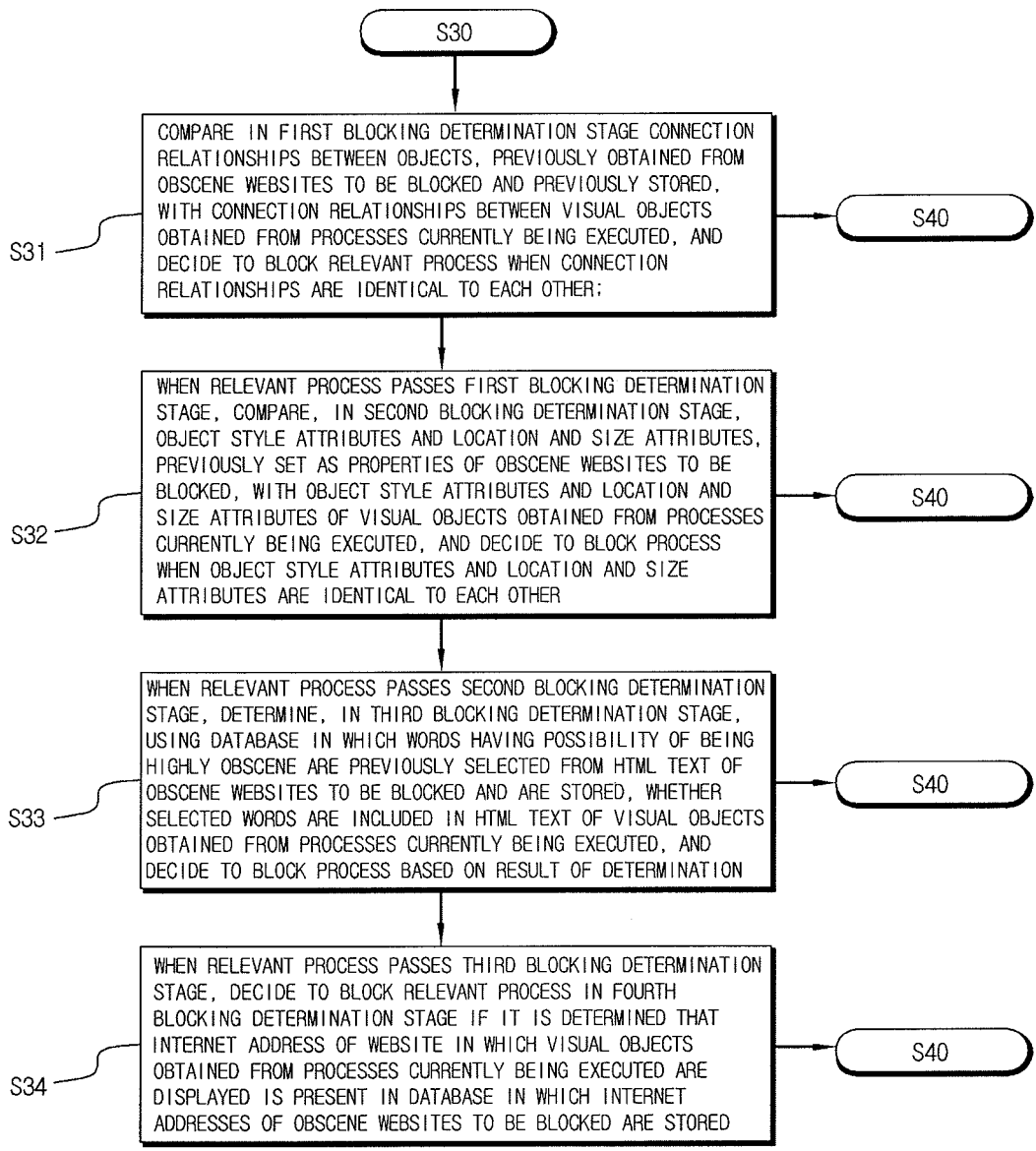
Figure 7:
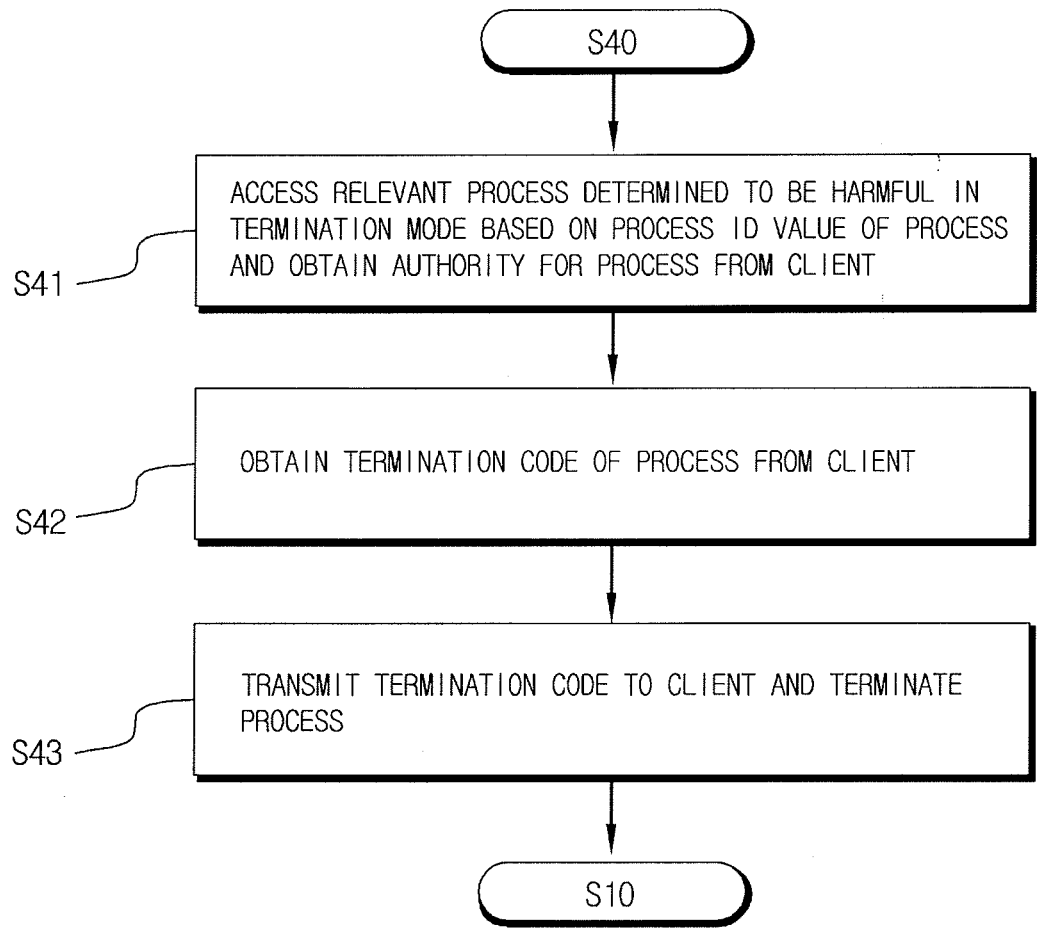

FIGS. 1 and 2 are diagrams showing embodiments of an object attribute access model according to one embodiment, and FIGS. 3 to 7 are flowcharts showing embodiments of a process for determining whether harmfulness is present, on the basis of object attributes obtained from a client, in an object attribute access engine according to one embodiment.

In the object attribute access model according to one embodiment, an object attribute access engine 10 requests information about visual objects currently being displayed on a screen by a client 11, in detail, processes currently being executed in an object-oriented Operating System (OS) running on the client 11, from the client 11 through communication with a server 13 being connected thereto, at step S10. At this time, the client 11 may be any Internet-accessible means such as a user computer, a terminal or a mobile device, in detail, an object-oriented OS running on the user computer or the like.

Further, the object attribute access engine 10 may be a program independent of the client 11, for example, a program solution installed on a separate server. The object attribute access engine 10 may access the client 11 over, for example, an internal network, an intranet or the Internet. Alternatively, the object attribute access engine 10 may request information related to a process executed in the client 11 from the client 11 at regular periods of, for example, 0.05 to 1 ms, and may search for related information.

A method of obtaining information about the visual objects will be described in detail. First, the object attribute access engine 10 retrieves a list of processes currently being executed and process information from the client 11. That is, the object attribute access engine 10 calls an instruction "OpenProcess PROCESS_QUERY_INFORMATION" on the client 11, and calls an instruction "EnumProcessModules" on the client 11 on the basis of the value of the instruction "PROCESS_QUERY_INFORMATION" received from the client 11, and thus retrieves the list of processes currently being executed at step S11.

Further, the object attribute access engine 10 transmits an instruction for obtaining the handle ID value of a currently activated window to the client 11, and obtains the handle ID value at step S12. The instruction used at this time may be "NowHandle=GetForegroundWindow ( )".

On the basis of the handle ID value obtained in this way, the object attribute access engine 10 requests the client 11 to convert the handle ID value into the process ID value of a process for executing the window, and thus acquires the process ID. This procedure is performed by converting the handle ID value into the process ID value using an instruction "GetWindowThreadProcessID" (GetWindowThreadProcessID Handle, ProcessID) at step S13.

This procedure is required to find a process related to the currently activated window from among the retrieved processes currently being executed. That is, when the converted process ID of the activated window is obtained, the object attribute access engine 10 finds an identical process by comparing the obtained process ID with process ID values included in the retrieved process list and process information at step S14.

When the identical process is found, the object attribute access engine 10 retrieves the values "th32ModuleID", "szExeFile" and "th32ParentProcessID" of the process from the process list and information, and thereafter obtains the handle ID value of the highest (root) visual object of a relevant program on the basis of the information of "ModuleID". That is, the object attribute access engine 10 transmits an instruction "RootHandleID=FindWindowX(th32ModuleID, 0, 0, 0)" to the client, and obtains the handle ID value of the root visual object at step S15.

On the basis of the handle ID value of the root visual object obtained in this way, all the handle ID values of the lower visual objects of the root visual object are obtained from the client at step S16. In this case, an instruction "ChildHandleID=EnumChildWindows(RootHandleID, 0, 0)" is used.

When the information about visual objects is obtained through the above procedure, a procedure for extracting the attributes of the visual objects from the information of the visual objects is performed at step S20.

That is, when all the handle ID values of lower visual objects connected to the root visual object are obtained, the object attribute access engine 10 obtains the individual attributes of the visual objects by calling the attributes on the client 11. Here, the individual attributes of the visual objects include an object style attribute, a caption attribute (the title of an object), a class attribute (the title of an object designated by a developer), object location and size attributes, an object content attribute (Hypertext Markup Language [HTML] text and Uniform Resource Locator [URL]), and the handle ID attribute of the parent visual object of a current object.

In this case, instructions for obtaining the individual attributes are defined as follows. That is, an instruction "GetWindowLong(ChildHandleID, GWL_EXSTYLE)" may be used as an instruction for obtaining an object style attribute, "GetWindowText(ChildHandleID)" may be used as an instruction for obtaining a caption attribute, "GetClassName(ChildHandleID)" may be used as an instruction for obtaining a class attribute, "GetWindowRect(ChildHandleID)" may be used as an instruction for obtaining object location and size attributes, "SendMessage ChildHandleID, WM_GETTEXT" may be used as an instruction for obtaining a content attribute, and "GetParentWindow(ChildHandleID)" may be used as an instruction for obtaining the handle ID attribute of the parent visual object of the current object at step S21.

Through the attributes of the visual objects obtained in this way, visual objects having the same parent visual object are connected and grouped, and connection relationships between the visual objects are generated after such a grouping operation has been completed at step S22.

When the attributes and connection relationships of the visual objects are prepared through the above procedure, the object attribute access engine 10 actually determines whether a relevant process is harmful, and decides whether to block the process. That is, in one embodiment, whether a relevant process is harmful is sequentially determined over a total of four stages at step S30.

The respective stages will be described in order. In the first blocking determination stage, the object attribute access engine 10 determines whether respective connection relationships are identical by comparing the connection relationships between objects, which have been previously acquired from obscene websites to be blocked and have been previously stored, with the connection relationships between visual objects obtained from the processes currently being executed. At this time, the visual objects are objects included in the process related to the activated window from among the processes currently being executed.

The connection relationships between the previously stored objects are obtained by extracting common patterns that are executed in about 200,000 obscene websites currently being distributed. One embodiment extracts a single pattern as the extracted patterns, but, in most cases, it is not possible to arrange the patterns as a single pattern, and thus a plurality of patterns regarded as commonly appearing in a plurality of obscene websites is prepared.

As an example of blocking using connection relationships, in the case of "playboy.com", an object "AnimatedGIF" is arranged on the fifth visual object while a visual object "FlashMoviePlayer" is arranged below a parent visual object "AxFlashMovie" so as to play an obscene video. Such a pattern appears only in the website "playboy.com", and thus whether the connection relationships between the visual objects are identical to those of the visual objects obtained from the processes currently being executed is determined.

If it is determined that the connection relationships are identical to each other, the object attribute access engine 10 determines that the visual objects are being executed by a harmful process, and then decides to block the process at step S31.

If the relevant process passes the above-described first blocking determination stage, the object attribute access engine 10 compares, in the second blocking determination stage, object style attributes and location and size attributes which have been previously set as the properties of obscene websites to be blocked, with the object style attributes and location and size attributes of the visual objects obtained from the processes currently being executed.

As an example of such a comparison procedure, in the case of "playboy.com", obscene content popup windows appear, and such a popup window is generally implemented not only to deactivate and hide a "MAXIMIZE" button, but also to deactivate a "CLOSE" button to prevent the window from being closed (this corresponds to the object style attribute of obscene content). In addition, in order to prevent the user from easily closing the window, the location information of the window is set as a "negative number" rather than a "positive number", thus enabling the window to be located outside the area of a monitor (this corresponds to the location and size attributes of obscene content). Such object attributes are peculiar forms implemented only in obscene content popup windows, and it is completely obvious that all content having such object attributes is obscene content. Therefore, the object style attributes and location and size attributes of the visual objects of obscene content are previously stored, and thus whether the object style attributes and location and size attributes of visual objects of the currently activated window are identical to those of obscene content is determined.

If it is determined that the attributes are identical to those of obscene content, the object attribute access engine 10 determines that the visual objects are executed by a harmful process, and then decides to block the process at step S32.

If the relevant process passes the above-described second blocking determination stage, the object attribute access engine 10 determines, in the third stage blocking determination stage, using a database (DB) in which several words having the possibility of being highly obscene are previously selected from the HTML text of obscene websites to be blocked and are previously stored, whether the selected words are included in HTML text contained in the visual objects obtained from the processes currently being executed.

At this time, the selected words are classified in descending order of the possibility of being obscene into respective grades, and are stored in the DB with weights assigned to the corresponding grades. Therefore, the object attribute access engine 10 searches the HTML text, contained in the visual objects obtained from the processes currently being executed, for words identical to the selected words, and assigns suitable weights to the found words, and thus determines whether a total sum of the found words exceeds a preset value.

For example, as words having the possibility of being highly obscene, various words such as "hardcore live", "free porno", "prostitute", "penis", "guardian angel", "netnanny", "breast" and "toilet" are selected from the HTML text of obscene websites, and grades are assigned to the words in the descending order of the possibility of being obscene. For example, a first grade is assigned to words "hardcore live" and "free porno", a second grade is assigned to words "prostitute" and "penis", a third grade is assigned to words "guardian angel" and "netnanny", and a fourth grade is assigned to words "breast" and "toilet". In this case, a weight of 100 points, a weight of 60 points, a weight of 40 points and a weight of 20 points are assigned to the first grade, the second grade, the third grade, and the fourth grade, respectively, and the preset value for a total sum is designated as 80 points.

At this time, when one word classified as the first grade is included in the HTML text of the visual objects obtained from the processes currently being executed, a total sum thereof exceeds 80 points corresponding to the preset value because the weight of 100 points was multiplied by the word, and thus the relevant process is determined to be a harmful process.

Further, when three words classified as the third grade are included in the HTML text, a total sum thereof is 120 points which exceeds the 80 points corresponding to the preset value because the 40 point weight was multiplied by the number of words, and thus the relevant process is determined to be a harmful process.

As a result of the determination, when the total sum exceeds the preset value, the object attribute access engine 10 determines that the visual objects are being executed by a harmful process, and then decides to block the process at step S33.

If the relevant process passes the third blocking determination stage, the object attribute access engine 10 determines, in the fourth blocking determination stage, whether the Internet address (URL) of the website in which the visual objects obtained from the processes currently being executed are displayed is present in a database in which the Internet addresses (URLs) of obscene websites to be blocked are stored. If it is determined that the Internet address is present in the DB, the object attribute access engine 10 determines that the visual objects are being executed by a harmful process, and then decides to block the process at step S34.

If the relevant process passes all the first to fourth blocking determination stages, the object attribute access engine 10 determines that the currently activated window is being executed by a non-harmful process, and then terminates examination for the relevant process.

Further, in the client, since an activated window may momentarily change, the above-described procedure is repeated in real time. Therefore, at the moment at which any visual object appears, the visual object immediately becomes an examination target. As a result, the visual object is not displayed on the monitor of the client, and, even if the visual object is displayed, it can be immediately blocked.

Meanwhile, if the relevant process is determined to be a harmful process by any one of the first to fourth blocking determination stages, the step of executing the termination of the process is started. That is, the object attribute access engine 10 requests the client 11 to terminate the process for displaying the visual objects, thus enabling the process to be terminated in the client at step S40.

In detail, when the relevant process is determined to be a harmful process and is decided to be blocked, the object attribute access engine 10 accesses the process in "Terminate" mode on the basis of the process ID of the relevant process, and obtains authority for the process from the client 11 at step S41. At this time, an instruction "ProcID=OpenProcess(PROCESS_QUERY_INFORMATION Or PROCESS_TERMINATE, False, nProc)" is used.

After the authority has been obtained, the termination code of the process is obtained from the client 11 at step S42. At this time, an instruction "GetExitCodeProcess ProcID, nExit" is used.

The object attribute access engine 10 transmits the obtained termination code to the client, and thus terminates the process at step S43. At this time, an instruction "TerminateProcess ProcID, nExit" is used.

According to the object attribute access model, data is directly transmitted between the client 11 and the server 13 without passing through the object attribute access engine 10. In addition, the object attribute access engine 10 does not perform an operation of hooking a message generated in the client 11 or sniffing data for the client 11. The object attribute access engine 10 merely requests required information from the client 11, or searches for the required information. Therefore, the client 11 and the server 13 transmit data separately from the object attribute access engine 10.

Further, since an interference operation such as hooking is not performed, a phenomenon in which Internet access speed decreases or in which Internet access is interrupted due to malfunction of the object attribute access engine 10 does not occur.

Even if malfunction occurs in the object attribute access engine 10 and the object attribute access engine 10 stops execution thereof, the transmission of data between the client 11 and the server 13 continues. Further, the object attribute access engine 10 may re-execute itself.

Further, when a watchdog timer is installed in the object attribute access engine 10, the object attribute access engine 10 re-executes itself, and continues to request information from the client 11 and determine whether harmfulness is present, which will be described later.

The above-described object attribute access model according to one embodiment is characterized in that it directly accesses the client 11 and obtains required information therefrom without waiting for the generation of a specific event.

Further, the object attribute access model according to one embodiment can block harmful websites which use intelligent frames. Some intelligent harmful websites use a method of creating windows composed of various layers such as a top level work frame, a level 2 work frame, a level 3 work frame and a level 4 work frame using, for example, frame tags, and then forwarding these windows to their harmful websites.

If a network sniffing method is used to block harmful websites, it is possible to determine that a relevant website is harmful by sniffing a network packet, but a blocking message for a relevant window cannot be transmitted to the client 11, and thus the execution of the harmful website cannot be blocked. Further, when a message hooking method is used, only a visual object causing an event is blocked, and a top level work frame is exposed to the client 11 without change. Further, the top level work frame calls a related program again from a harmful website by utilizing an OnExit event enabling the fact that the blocked window has been externally transmitted to be checked. Therefore, it is actually difficult to block harmful websites.

In contrast, the object attribute access model according to one embodiment accesses information about all processes or object attributes, determines whether harmfulness is present, and blocks access to the server 13, thus blocking harmful websites using such intelligent frames.

Furthermore, the object attribute access model according to one embodiment can block access to harmful websites even if the client 11 is operated offline.

In more detail, in the case of Internet Explorer, a Work Offline option is present. When this option is used, it is possible to call a related program from a website which the client once accessed, without making a connection to the network. However, the object attribute access model determines whether a relevant website is a harmful website on the basis of information about programs executed in real time in the client 11 or object attributes, regardless of whether the client 11 accesses the server 13. Therefore, even if the client 11 works offline, access to harmful websites can be blocked.

Accordingly, the harmful website blocking method according to one embodiment is advantageous in that it does not influence network access and does not result in an operation related to the operation of Windows, for example, an execution-related operation such as the hooking of an event message, thus guaranteeing the stability of network access and the operation of Windows.

Further, even if an error occurs in a blocking program itself, it does not influence network access and the operation of Windows, thus preventing erroneous operation attributable to the blocking program, and in that, when an error occurs in the blocking program, the re-execution of the blocking program alone is possible, thus reliably and continuously blocking harmful websites.

In addition, since it determines whether a relevant website is harmful through a real-time object access method rather than a hooking method, harmful websites can be very promptly and immediately blocked, thus greatly increasing harmful website blocking efficiency.

Moreover, since only the attributes of objects can be detected using an object attribute access method, harmful websites can be reliably blocked without an operation program or a network being shut down, thus enabling the harmful website blocking method to be reliably and securely used in businesses as well as homes, and in that, since the operation of a user terminal is not delayed while harmful websites are blocked, users' inconvenience attributable to harmful website blocking can be minimized.

As described above, at least one embodiment provides a real-time harmful website blocking method using an object attribute access engine, which does not influence network access and does not result in an operation related to the operation of Windows, for example, an execution-related operation such as the hooking of an event message, thus guaranteeing the stability of network access and the operation of Windows.

Although embodiments have been disclosed for illustrative purposes, those skilled in the art will appreciate that various modifications, additions and substitutions are possible, without departing from the scope and spirit of the accompanying claims.

What is claimed is:

1. A real-time harmful website blocking method using an object attribute access engine, comprising:
 obtaining information about visual objects, currently being displayed on a screen by a process currently being executed, from a client;
 extracting attributes of the visual objects from the information about the visual objects;
 determining whether harmfulness is present based on the extracted object attributes, and thus deciding whether to block access to a server being connected thereto; and
 requesting the client to terminate the process for displaying the visual objects,
 wherein the obtaining comprises:
 retrieving a list of processes currently being executed and process information from the client;
 transmitting an instruction for obtaining a handle ID value of a currently activated window to the client and obtaining the handle ID value;
 requesting the client to convert the handle ID value into a process ID value for executing the window, and obtaining the process ID value;
 finding an identical process corresponding to the process ID value from the list of processes currently being executed and process information, based on the process ID value;

extracting a root visual object from the found identical process, and obtaining a handle ID value of the visual object; and obtaining handle ID values of lower visual objects based on the handle ID value of the root visual object, wherein the extracting comprises:

calling individual attributes of the visual objects on the client and obtaining the individual attributes from the client, based on the handle ID values of the visual objects; and grouping visual objects having an identical parent visual object through the obtained attributes of the visual objects, and generating connection relationships between the visual objects, wherein the determining comprises:

comparing, in a first blocking determination stage, connection relationships between objects previously obtained from obscene websites to be blocked and previously stored, with connection relationships between the visual objects obtained from the process currently being executed, and then deciding to block the process when the connection relationships are identical to each other;

if the process passes the first blocking determination stage, comparing, in a second blocking determination stage, object style attributes and location and size attributes, previously set as properties of obscene websites to be blocked, with object style attributes and location and size attributes of the visual objects obtained from the process currently being executed, and then deciding to block the process when the object style attributes and the location and size attributes are identical to each other;

if the process passes the second blocking determination stage, determining, in a third blocking determination stage, using a database in which words having a possibility of being highly obscene are previously selected from Hypertext Markup Language (HTML) text of obscene websites to be blocked and are previously stored, whether the selected words are included in HTML text of the visual objects obtained from the process currently being executed, and then deciding to block the process, based on a result of the determination; and if the process passes the third blocking determination stage, deciding to block the process in a fourth blocking determination stage when an Internet address of a website on which the visual objects obtained from the process currently being executed are displayed is present in a database in which Internet addresses of obscene websites to be blocked are stored.

2. The real-time harmful website blocking method according to claim 1, wherein the client is an object-oriented Operating System (OS) running on a user computer.

3. The real-time harmful website blocking method according to claim 1, wherein the information about the visual objects is requested at regular periods of about 0.05 ms to about 1 ms.

4. The real-time harmful website blocking method according to claim 1, wherein the third blocking determination stage is performed such that:

the selected words are classified in descending order of a possibility of being obscene into respective grades, and are stored in a database with weights assigned to the grades, and the HTML text included in the visual objects obtained from the process currently being executed is searched for words identical to the selected words, weights are assigned to the found words, and it is determined that the process is a harmful process if a total sum of the found words exceeds a preset value.

5. The real-time harmful website blocking method according to claim 1, wherein the requesting comprises:

accessing the process determined to be harmful in termination mode, based on a process ID value of the process, and obtaining authority for the process from the client;

obtaining a termination code of the process from the client; and transmitting the termination code to the client and terminating the process.

6. The real-time harmful website blocking method according to claim 1, wherein the obtaining, the extracting or the determining is re-executed if it is delayed by a predetermined period of time or longer.

7. The real-time harmful website blocking method according to claim 6, wherein the re-execution is performed by a watchdog timer.

8. A real-time harmful website blocking system using an object attribute access engine, comprising:

means for obtaining information about visual objects, currently being displayed on a screen by a process currently being executed, from a client;

means for extracting attributes of the visual objects from the information about the visual objects;

means for determining whether harmfulness is present based on the extracted object attributes, and thus deciding whether to block access to a server being connected thereto; and means for requesting the client to terminate a process for displaying the visual objects, wherein the obtaining comprises:

means for retrieving a list of processes currently being executed and process information from the client;

means for transmitting an instruction for obtaining a handle ID value of a currently activated window to the client and obtaining the handle ID value;

means for requesting the client to convert the handle ID value into a process ID for executing the window, and obtaining the process ID value;

means for finding an identical process corresponding to the process ID value from the list of processes currently being executed and process information, based on the process ID value;

means for extracting a root visual object from the found identical process, and obtaining a handle ID value of the visual object; and means for obtaining handle ID values of lower visual objects based on the handle ID value of the root visual object, wherein the extracting comprises:

means for calling individual attributes of the visual objects on the client and obtaining the individual attributes from the client, based on the handle ID values of the visual objects; and means for grouping visual objects having an identical parent visual object through the obtained attributes of the visual objects, and generating connection relationships between the visual objects, wherein the determining comprises:

means for comparing, in a first blocking determination stage, connection relationships between objects previously obtained from obscene websites to be blocked and previously stored, with connection relationships between the visual objects obtained from the process currently being executed, and then deciding to block a process when the connection relationships are identical to each other;

if the process passes the first blocking determination stage, means for comparing, in a second blocking determination stage, object style attributes and location and size attributes, previously set as properties of obscene websites to be blocked, with object style attributes and location and size attributes of the visual objects obtained from the process currently being executed, and then deciding to block the process when the object style attributes and the location and size attributes are identical to each other;

if the process passes the second blocking determination stage, means for determining, in a third blocking determination stage, using a database in which words having a possibility of being highly obscene are previously selected from Hypertext Markup Language (HTML) text of obscene websites to be blocked and are previously stored, whether the selected words are included in HTML text of the visual objects obtained from the process currently being executed, and then deciding to block the process, based on a result of the determination; and if the process passes the third blocking determination stage, means for deciding to block the process in a fourth blocking determination stage when an Internet address of a website on which the visual objects obtained from the process currently being executed are displayed is present in a database in which Internet addresses of obscene websites to be blocked are stored.

* * * * *